United States Patent
Shimura et al.

(10) Patent No.: US 10,395,149 B2
(45) Date of Patent: Aug. 27, 2019

(54) IMAGE FORMING APPARATUS HAVING PRINT JOB TIME DISPLAY AND IMAGE QUALITY ADJUSTMENT CONTROL

(71) Applicant: CANON KABUSHIKI KAISHA, Tokyo (JP)

(72) Inventors: Hiromi Shimura, Toride (JP); Hiroto Nishihara, Tsukuba (JP); Keita Takahashi, Abiko (JP); Hiroshi Matsumoto, Toride (JP); Shinnosuke Iwadate, Toride (JP); Ryou Sakaguchi, Toride (JP); Teruhito Kai, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 21 days.

(21) Appl. No.: 15/377,433

(22) Filed: Dec. 13, 2016

(65) Prior Publication Data

US 2017/0185875 A1    Jun. 29, 2017

(30) Foreign Application Priority Data

Dec. 24, 2015 (JP) ................................. 2015-251691

(51) Int. Cl.
*H04N 1/00* (2006.01)
*H04N 1/60* (2006.01)
(Continued)

(52) U.S. Cl.
CPC ..... *G06K 15/1823* (2013.01); *H04N 1/00832* (2013.01); *H04N 1/4078* (2013.01);
(Continued)

(58) Field of Classification Search
CPC ............. G06K 15/1823; H04N 1/4078; H04N 1/00053; H04N 1/00082; H04N 1/00084; H04N 1/00087; H04N 1/00002
See application file for complete search history.

(56) References Cited

U.S. PATENT DOCUMENTS 8,576,427 B2   11/2013   Sakai
8,605,306 B2   12/2013   Takahashi
(Continued)

FOREIGN PATENT DOCUMENTS

JP    2007-114289    5/2007

OTHER PUBLICATIONS

U.S. Appl. No. 15/373,098, filed Dec. 8, 2016.

*Primary Examiner* — Christopher Wait
(74) *Attorney, Agent, or Firm* — Venable LLP

(57) ABSTRACT

An image forming apparatus includes an image forming unit, an adjustment unit configured to select a type of adjustment processing and execute the selected type of adjustment processing for the image forming unit, and a determination unit to determine an adjustment time based on the selected type of adjustment processing. The determination unit determines, in a case where the adjustment unit causes the image forming unit to stop the image forming operation for executing the selected type of adjustment processing in a downtime, a first adjustment time, and wherein the determination unit determines, in a case where the image forming unit has finished the image forming operation, a second adjustment time longer than the first adjustment time.

3 Claims, 11 Drawing Sheets

(51) Int. Cl.
*G06K 15/02* (2006.01)
*H04N 1/407* (2006.01)

(52) U.S. Cl.
CPC ........ *H04N 1/6008* (2013.01); *H04N 1/6044* (2013.01); *H04N 1/6091* (2013.01); *G06K 2215/0094* (2013.01); *H04N 2201/0094* (2013.01)

(56) References Cited

U.S. PATENT DOCUMENTS

| | | | |
|---|---|---|---|
| 2008/0038004 A1* | 2/2008 | Inoue | G03G 15/6564 399/394 |
| 2008/0088891 A1* | 4/2008 | Shiraishi | H04N 1/40006 358/504 |
| 2015/0103364 A1* | 4/2015 | Abe | H04N 1/00477 358/1.13 |
| 2016/0012320 A1 | 1/2016 | Takahashi | |
| 2016/0342124 A1 | 11/2016 | Iwadate | |

* cited by examiner

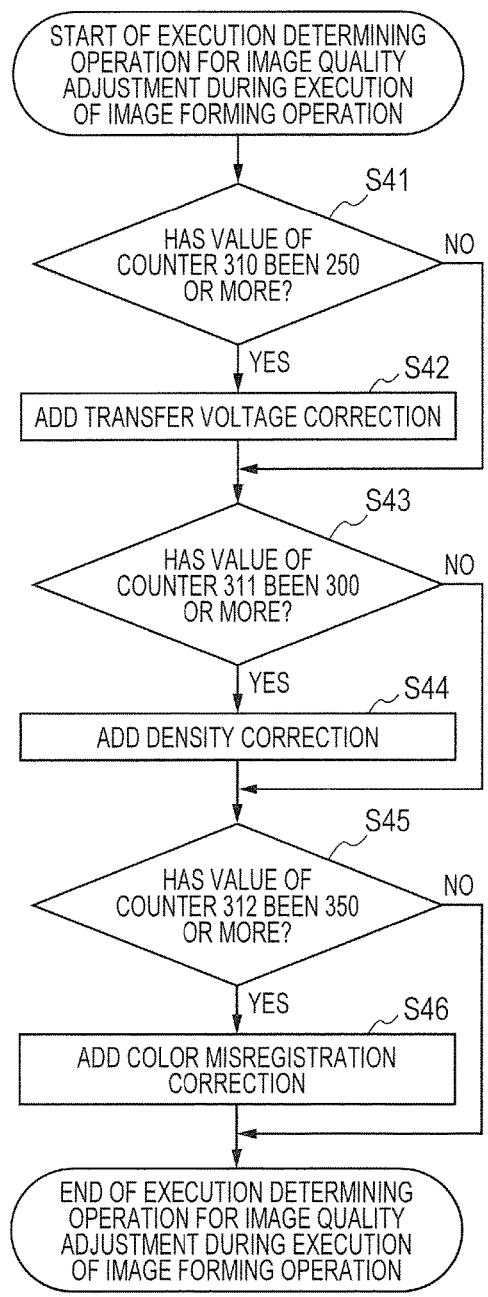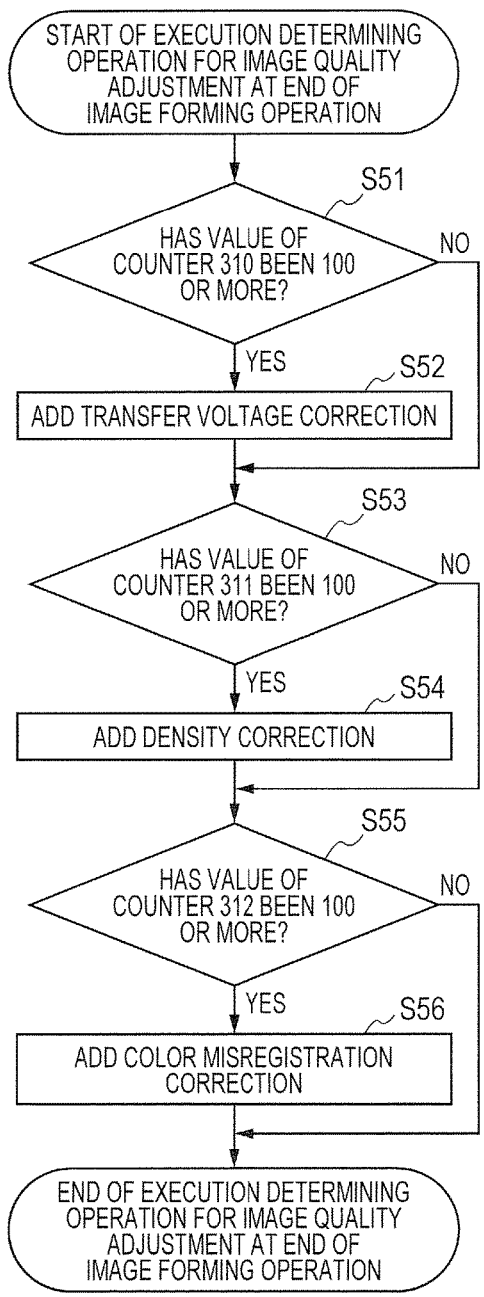

BEFORE DURABILITY OR HIGH HUMIDITY ENVIRONMENT

AFTER DURABILITY OR LOW HUMIDITY ENVIRONMENT

IMAGE FORMING APPARATUS HAVING PRINT JOB TIME DISPLAY AND IMAGE QUALITY ADJUSTMENT CONTROL

BACKGROUND OF THE INVENTION

Field of the Invention

The present invention relates to an image forming apparatus configured to form an image on a recording medium.

Description of the Related Art

Hitherto, in an image forming apparatus, e.g., a copying machine or a printer, a time required for a print job is displayed in order to predict a time at which a user can obtain a printed product and predict a time at which the image forming apparatus becomes available next. Further, in the image forming apparatus, e.g., a copying machine or a printer, an image quality adjustment operation is conducted while an image is not being formed in order to maintain satisfactory image quality.

In Japanese Patent Application Laid-Open No. 2007-114289, the above-mentioned time required for the print job is displayed by including a time for conducting the image quality adjustment operation while being counted down, to thereby improve accuracy of the time required for the print job to be displayed.

Hitherto, a typical value (fixed value) defined in advance for each type of image quality adjustment has been used in order to display an image quality adjustment time (remaining time). When a correct result is not obtained in the image quality adjustment, a readjustment for executing the image quality adjustment again (hereinafter referred to as "retry operation") may be executed. However, in the related art, the retry operation causes reduction in accuracy of the image quality adjustment time to be displayed. For example, when the time for the image quality adjustment increases due to the retry operation, the image quality adjustment may fail to be completed within the displayed image quality adjustment time, or the displayed image quality adjustment time may increase at some midpoint. This raises a problem in that it is hard to grasp the time at which the user can collect an output product or the time at which the image forming apparatus becomes available next.

SUMMARY OF THE INVENTION

Therefore, the present invention provides an image forming apparatus configured to display an image quality adjustment time which allows a user to easily grasp a time at which the user can collect an output product and a time at which the image forming apparatus becomes available next.

According to one embodiment of the present invention, there is provided an image forming apparatus, comprising:

an image forming unit configured to form an image on a sheet;

an adjustment unit configured to select a type of adjustment processing to be executed for the image forming unit from among a plurality of types of adjustment processing for adjusting the image forming unit, and to execute the selected type of adjustment processing for the image forming unit;

a determination unit configured to determine an adjustment time based on the selected type of adjustment processing; and a display unit configured to display the adjustment time determined by the determination unit, wherein the determination unit determines, in a case where the adjustment unit causes the image forming unit to stop the image forming operation for executing the selected type of adjustment processing in a downtime, a first adjustment time based on the selected type of adjustment processing, wherein the determination unit determines, in a case where the image forming unit has finished the image forming operation, a second adjustment time based on the selected type of adjustment processing, and wherein the second adjustment time is longer than the first adjustment time.

Further features of the present invention will become apparent from the following description of exemplary embodiments with reference to the attached drawings.

BRIEF DESCRIPTION OF THE DRAWINGS

FIGS. 4A and 4B are flowcharts for each illustrating an execution determining operation for an image quality adjustment executed by a CPU.

DESCRIPTION OF THE EMBODIMENTS

Now, embodiments for carrying out the present invention will be described with reference to the accompanying drawings.

First Embodiment (Image Forming Apparatus)

Figure 1:
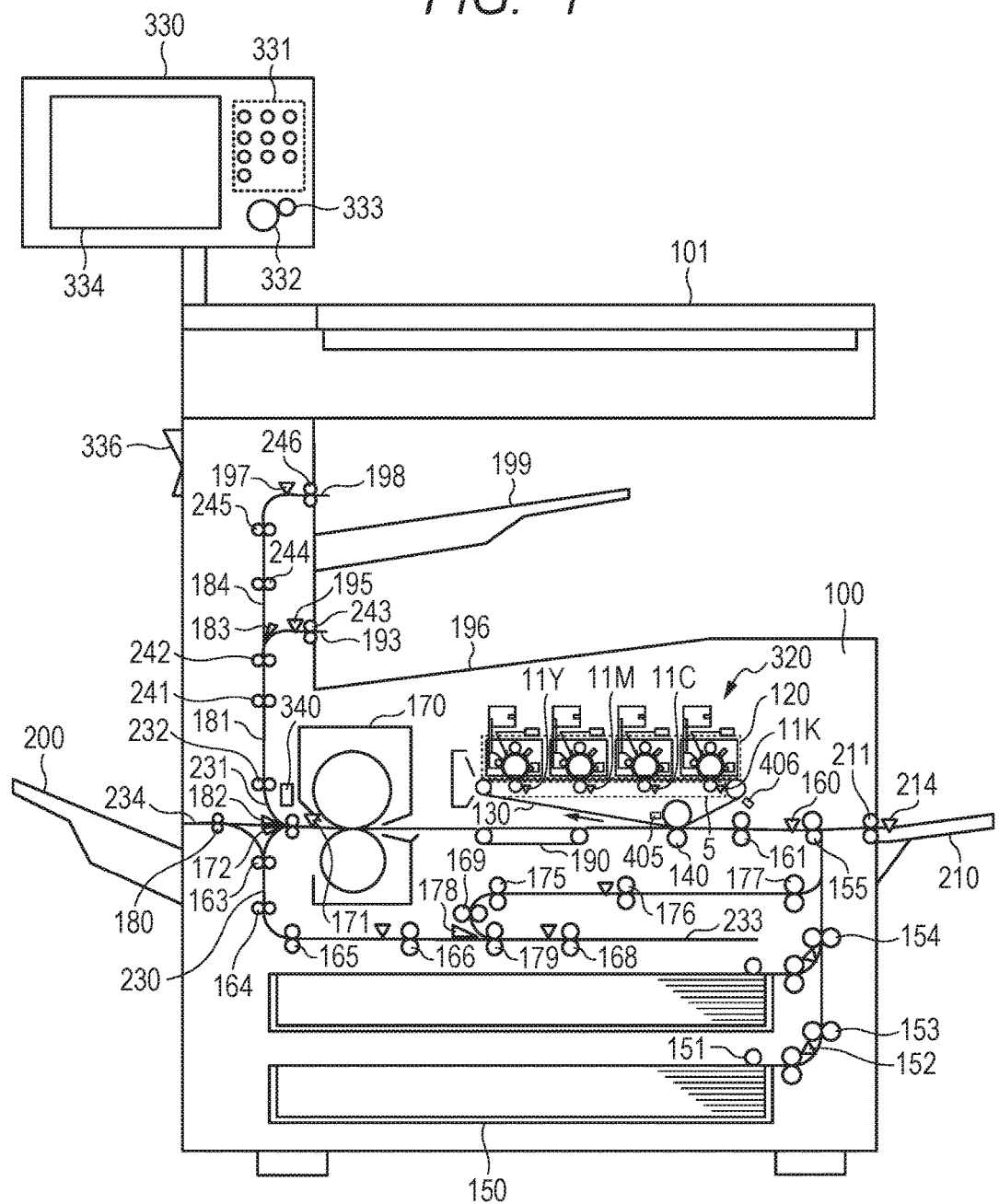
FIG. 1 is a sectional view of an image forming apparatus.

FIG. 1 is a sectional view of an image forming apparatus 100. The image forming apparatus 100 includes an image reading portion (scanner portion) 101 and a user interface (hereinafter referred to as "UI") 330 in a top part of the image forming apparatus 100. The image forming apparatus 100 is an electrophotographic color copying machine configured to form a color image on a recording medium (hereinafter referred to as "sheet") through use of toners of a plurality of colors.

Figure 2:
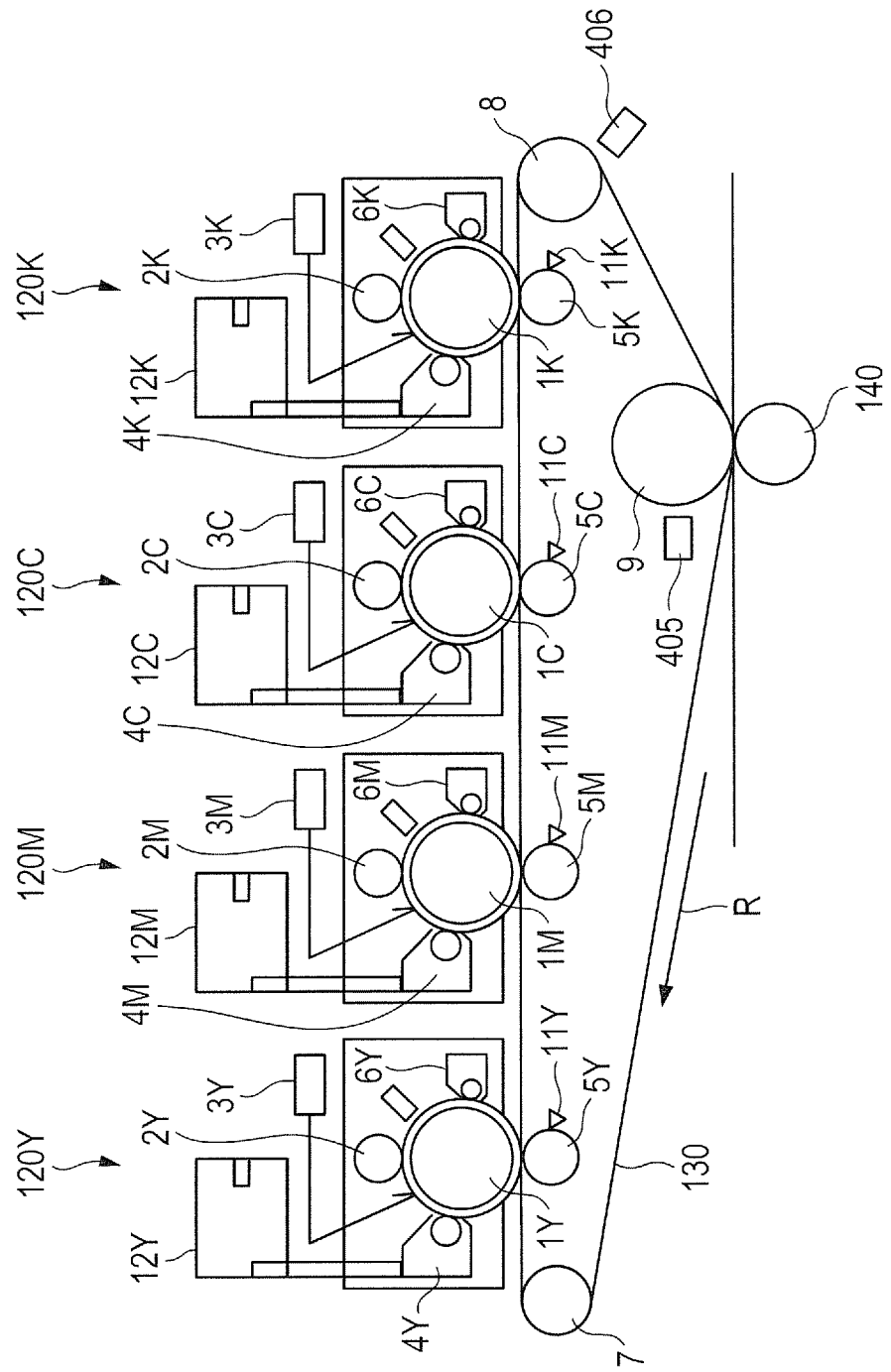
FIG. 2 is a view for illustrating an image forming portion of the image forming apparatus.

FIG. 2 is a view for illustrating an image forming portion (image forming unit) 320 of the image forming apparatus 100. The image forming portion 320 includes four process units 120 (120Y, 120M, 120C, and 120K). The process unit 120Y is configured to form a yellow image through use of a yellow toner. The process unit 120M is configured to form a magenta image through use of a magenta toner. The process unit 120C is configured to form a cyan image through use of a cyan toner. The process unit 120K is configured to form a black image through use of a black toner. The four process units 120 have the same structure except for the colors of developers (toners). Hence, unless otherwise necessary, the letters Y, M, C, and K are omitted from the reference symbols in the following description.

The process unit 120 includes a photosensitive drum (image bearing member) 1 serving as a photosensitive member. A charging device 2, a light scanning device (laser scanner unit) 3, a developing device 4, a primary transfer device 5, and a cleaning device 6 are arranged around the photosensitive drum 1. A developer container 12 is configured to supply a developer (toner) to the developing device 4. An endless intermediate transfer belt (intermediate transfer member) 130 is arranged below the photosensitive drum 1.

The intermediate transfer belt 130 is looped around a drive roller 7 and driven rollers 8 and 9. The intermediate transfer belt 130 is rotated toward a direction indicated by an arrow R during image formation. The primary transfer device 5 is arranged so as to be opposed to the photosensitive drum 1 across the intermediate transfer belt 130. The primary transfer device 5 is configured to transfer a toner image on the photosensitive drum 1 onto the intermediate transfer belt 130.

A patch sensor (density detection device and color misregistration detection device) 406 configured to detect a patch image for density correction and a pattern image for color misregistration correction that are transferred onto the intermediate transfer belt 130 is provided in the vicinity of the intermediate transfer belt 130. At a time of the color misregistration correction, the process unit 120 forms a predetermined pattern image for the color misregistration correction in each color on the intermediate transfer belt 130. The patch sensor 406 detects the predetermined pattern image for the color misregistration correction in each color. A misregistration amount of the toner image in each color transferred onto the intermediate transfer belt 130 is obtained based on a result of the detection. At a time of the density correction, the process unit 120 forms a predetermined patch image for the density correction in each color on the intermediate transfer belt 130. The patch sensor 406 detects the predetermined patch image for the density correction in each color. A density of the toner image in each color transferred onto the intermediate transfer belt 130 is obtained based on a result of the detection.

A secondary transfer portion (secondary transfer roller) 140 is arranged so as to be opposed to the driven roller 9 across the intermediate transfer belt 130. The primary transfer devices 5Y, 5M, 5C, and 5K include transfer voltage sensors 11Y, 11M, 11C, and 11K, respectively. The transfer voltage sensors 11Y, 11M, 11C, and 11K are configured to detect primary transfer voltages applied to the primary transfer devices 5Y, 5M, 5C, and 5K, respectively. The image forming apparatus 100 includes an environmental sensor 405 configured to detect a temperature and a humidity in an inside of the image forming apparatus 100.

Figure 3:
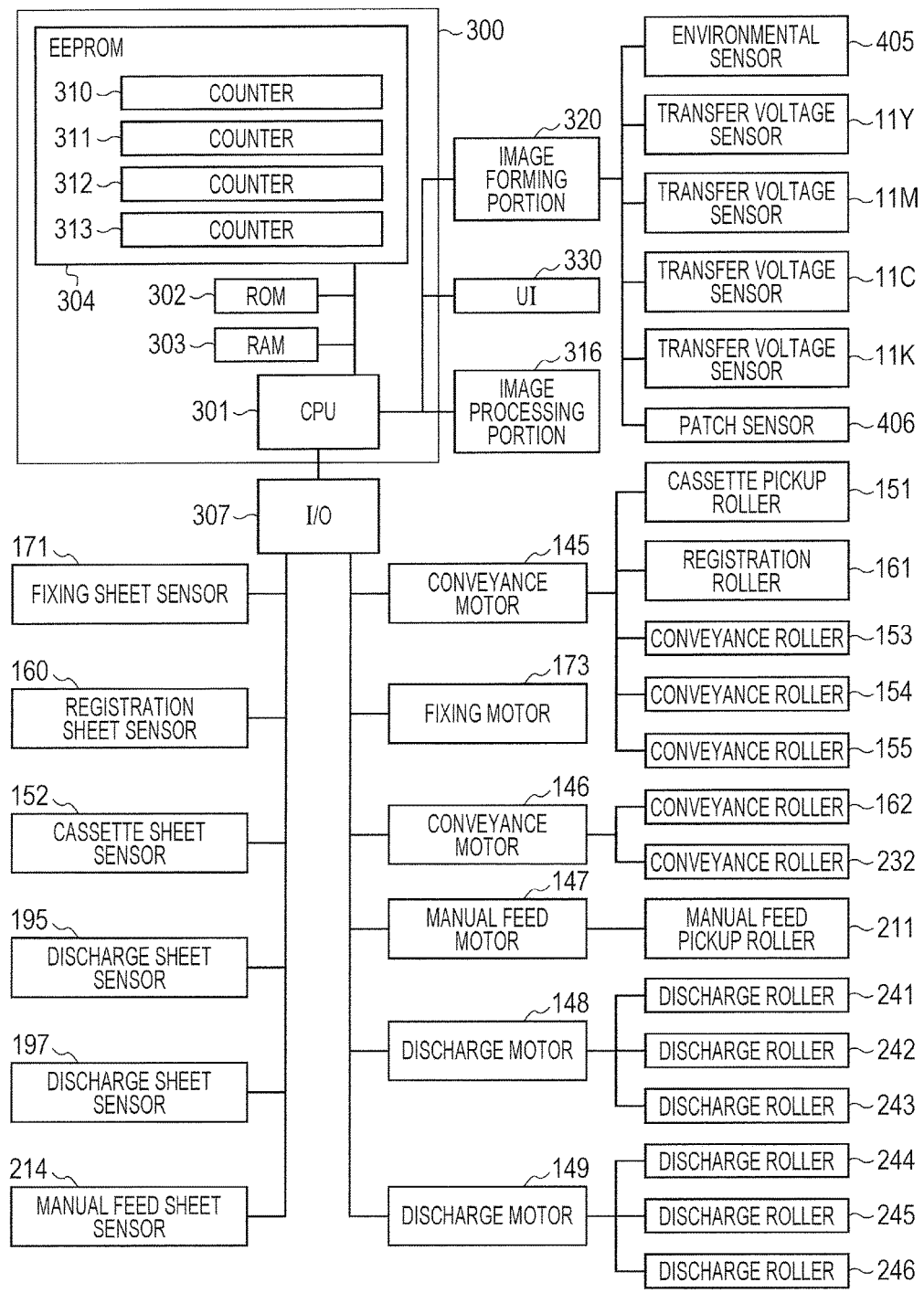
FIG. 3 is a block diagram for illustrating a control system of the image forming apparatus.

FIG. 3 is a block diagram for illustrating a control system of the image forming apparatus 100. A control unit 300 includes a CPU (controller) 301, a ROM (storage portion) 302, a RAM (storage portion) 303, and an EEPROM (non-volatile memory) 304. The control unit 300 is electrically connected to the UI 330 serving as an operation portion configured to allow a user to input various operation instructions. The CPU 301 is capable of communicating to/from the UI 330. When an instruction (hereinafter referred to as "job") to, for example, start an image forming operation is input from the UI 330 to the CPU 301, the CPU 301 starts the image forming operation.

The CPU 301 is configured to control a conveyance motor 145, a fixing motor 173, a conveyance motor 146, a manual feed motor 147, a discharge motor 148, and a discharge motor 149 through I/O (input/output device) 307. The CPU 301 is further configured to detect a signal received from each of a fixing sheet sensor 171, a registration sheet sensor 160, a cassette sheet sensor 152, a discharge sheet sensor 195, a discharge sheet sensor 197, and a manual feed sheet sensor 214 through the I/O 307.

The CPU 301 is capable of communicating to/from an image processing portion 316 configured to process an image corresponding to a content of the job received from the UI 330. The image processing portion 316 bidirectionally communicates to/from the CPU 301 to execute image processing including extraction and rotation of an image. The CPU 301 is configured to control the image forming portion 320. The image forming portion 320 controls the supply of a high voltage to the process unit 120, the intermediate transfer belt 130, and the secondary transfer portion 140, controls the driving of those components, and controls the light scanning device (exposure device) 3. The CPU 301 detects, via the image forming portion 320, a signal received from each of the transfer voltage sensors 11Y, 11M, 11C, and 11K included in the primary transfer device 5, and detects an application state of a transfer voltage applied to the primary transfer device 5 based on the detected signal. The CPU 301 detects a temperature and a humidity in the vicinity of the process unit 120 based on a signal received from the environmental sensor 405. The CPU 301 detects a surface state of the intermediate transfer belt 130 based on a signal received from the patch sensor 406. The image forming portion 320 controls a temperature of a heater of a fixing device 170. When executing copying, the image reading portion 101 reads an image of an original, and transmits image data on the image to the image processing portion 316.

The UI 330 serving as the operation portion includes an input key group 331 to be used when the user inputs information and a start key 332 to be pressed for starting the image forming operation. The UI 330 further includes a stop key 333 to be pressed for suspending the image forming operation and a display (display unit) 334 serving as a display unit for displaying a state of the image forming apparatus 100.

(Image Forming Operation)

Next, the image forming operation (printing operation) of the image forming apparatus 100 will be described with reference to FIG. 1, FIG. 2, and FIG. 3. When receiving the job from the UI 330, the CPU 301 starts the image forming operation based on the received job. The CPU 301 drives the conveyance motor 145, which serves as a driving source of a cassette pickup roller 151, through the I/O 307 to rotate the cassette pickup roller 151, and feeds sheets inside the sheet feeding cassette 150 one by one. At this time, the CPU 301 determines whether or not a sheet feeding operation has been conducted normally based on a detection signal of the cassette sheet sensor 152.

A description will be made with the sheet feeding from a manual feed tray (multi-purpose tray) 210 serving as a sheet placement portion to the inside of the image forming apparatus 100. The manual feed tray 210 is provided with the manual feed sheet sensor 214. The manual feed sheet sensor 214 is configured to detect a sheet placed on the manual feed tray 210. The CPU 301 determines whether or not a sheet is placed on the manual feed tray 210 based on a detection signal of the manual feed sheet sensor 214. When the CPU 301 receives an instruction to feed the sheet on the manual feed tray 210 from the UI 330 with the sheet being placed on the manual feed tray 210, the CPU 301 operates in the following manner. The CPU 301 drives the manual feed motor 147 through the I/O 307 to rotate the manual feed pickup rollers 211. The manual feed pickup rollers 211 are rotated, to thereby feed the sheets on the manual feed tray 210 one by one. The CPU 301 determines whether or not the sheet feeding operation has been conducted normally based on a detection signal of the registration sheet sensor 160.

The CPU 301 starts the image forming operation of the process unit 120 so as to be in time for a timing at which the sheet arrives at the secondary transfer portion 140. In the process unit 120Y, the charging device 2Y uniformly charges a surface of the photosensitive drum 1Y. The light scanning device 3Y emits a light beam (laser beam) modulated based on image information on a yellow component to the uniformly charged surface of the photosensitive drum 1Y to form an electrostatic latent image on the surface of the photosensitive drum 1Y. The developing device 4Y develops the electrostatic latent image with the yellow toner (developer) to form a yellow toner image. A primary transfer voltage is applied to the primary transfer device 5Y, and the primary transfer device 5Y primarily transfers the yellow toner image on the photosensitive drum 1Y onto the intermediate transfer belt 130. The toner remaining on the photosensitive drum 1Y after the primary transfer is removed by the cleaning device 6Y, and the photosensitive drum 1Y becomes ready for the next image formation.

In the same manner, a magenta toner image formed by the process unit 120M is transferred onto the intermediate transfer belt 130 so as to be superimposed on the yellow toner image on the intermediate transfer belt 130 with high precision. Subsequently, a cyan toner image and a black toner image are transferred onto the intermediate transfer belt 130 so as to be superimposed on the magenta toner image on the intermediate transfer belt 130 in order. As a result, the toner images in the four colors are superimposed on one another on the intermediate transfer belt 130. The toner images superimposed on one another on the intermediate transfer belt 130 arrive at the secondary transfer portion 140 by the rotation of the intermediate transfer belt 130.

The CPU 301 adds one to a counter 310 stored in the EEPROM 304 each time a primary transfer operation is conducted once. The CPU 301 adds one to a counter 311 and a counter 312 stored in the EEPROM 304 each time a developing operation is conducted once. A value (count value) of the counter 310, a value (count value) of the counter 311, and a value (count value) of the counter 312 are used for execution determination of an image quality adjustment operation (adjustment processing) described later. The CPU 301 further adds one to a counter 313 stored in the EEPROM 304 each time the primary transfer operation is conducted once. The counter 313 counts a total number of primary transfer operations that have been conducted since the image forming apparatus 100 was first used.

In the embodiment, the image forming apparatus 100 may not necessarily be provided with the counter 313. A value (count value) of the counter 313 is used to determine how the primary transfer device 5 deteriorates through long-term use in the image forming apparatus 100 according to a second embodiment of the present invention described later.

The sheet is conveyed to registration rollers 161 from the sheet feeding cassette 150 by the cassette pickup roller 151 and conveyance rollers 153, 154, and 155 or from the manual feed tray 210 by the manual feed pickup rollers 211. The CPU 301 detects a position of the conveyed sheet based on the detection signal of the registration sheet sensor 160. In consideration of a timing at which a leading edge portion of the sheet arrived at the registration sheet sensor 160, the CPU 301 controls the conveyance of the sheet so that the leading edge portion of the sheet and a leading edge portion of the toner images on the intermediate transfer belt 130 match at the secondary transfer portion 140. For example, when the sheet arrives earlier than the toner images, the CPU 301 stops the sheet at the registration roller 161 for as long a time as the difference in arrival timing, and then restarts the conveyance of the sheet. When the sheet and the toner images arrive at the secondary transfer portion 140, the secondary transfer portion 140 to which the secondary transfer voltage is applied transfers the toner images onto the sheet.

The sheet onto which the toner images have been transferred is conveyed to the fixing device 170 by a conveyor belt 190. The fixing device 170 heats and pressurizes the sheet to fix the toner images to the sheet. In this manner, a full-color image is formed on the sheet.

When the leading edge portion of the sheet arrives at the fixing sheet sensor 171, the CPU 301 determines which of conveyance paths 230, 231, and 234 the sheet is to be conveyed to based on the content of the job specified by the UI 330 in advance. The CPU 301 switches conveyance flappers 172 and 182, to thereby switch among the conveyance paths 230, 231, and 234 for the sheet. Specifically, when the sheet having an image formed on one side during double-sided printing is conveyed to the image forming portion 320 again and when the sheet is discharged onto a discharge tray 200 with a printed surface facing down during single-sided printing, the CPU 301 switches the conveyance flapper 172 to convey the sheet to the conveyance path 230. When the sheet is discharged onto a discharge tray 196 or a discharge tray 199 during the single-sided printing or the double-sided printing, the CPU 301 switches the conveyance flapper 182 to convey the sheet to the conveyance path 231. When the sheet is discharged onto the discharge tray 200, the CPU 301 switches the conveyance flappers 172 and 182 to convey the sheet to the conveyance path 234.

The sheet conveyed to the conveyance path 231 is further conveyed to a conveyance path 181 on downstream by conveyance rollers 232, and conveyed to the discharge tray 196 or the discharge tray 199. When a discharge instruction to the discharge tray 196 is issued, a conveyance path is switched to a conveyance path 193 by a flapper 183. The sheet is conveyed from the conveyance path 181 to the conveyance path 193 by discharge rollers 241, 242, and 243 driven by the discharge motor 148, and is discharged onto the discharge tray 196. When a discharge instruction to the discharge tray 199 is issued, the conveyance path is switched to a conveyance path 184 by the flapper 183. The sheet is conveyed from the conveyance path 181 to a conveyance path 198 through the conveyance path 184 by discharge rollers 244, 245, and 246 driven by the discharge motor 149, and is discharged onto the discharge tray 199.

When the sheet is discharged onto the discharge tray 200 with a printed surface facing down during the single-sided printing, the conveyance flapper 172 is switched to convey the sheet to the conveyance path 230. When a trailing edge portion of the sheet arrives at reverse rollers 163, the reverse rollers 163 are rotated in reverse, and the sheet is conveyed to discharge rollers 180, and is discharged onto the discharge tray 200 as it is.

When the sheet having an image formed on one side during the double-sided printing is conveyed to the image forming portion 320 again, the conveyance flapper 172 is switched to convey the sheet to the conveyance path 230. The sheet is conveyed to the two-side reversing conveyance path 233 by duplex conveyance rollers 164, 165, 166, 179, and 168. When the trailing edge portion of the sheet arrives at the duplex conveyance rollers 179, the CPU 301 switches a two-side reversing flapper 178, and rotates the duplex conveyance rollers 179 and 168 in reverse to convey the sheet to duplex conveyance rollers 169. The sheet is conveyed by the duplex conveyance rollers 169 and duplex conveyance rollers 175, 176, and 177, and is passed over to the conveyance rollers 155.

When all the jobs are completed, the CPU 301 displays the completion of the jobs on the UI 330. The above-mentioned image forming operation is merely an example, and the present invention is not limited to the above-mentioned image forming operation.

(Image Quality Adjustment Operation)

Next, the image quality adjustment operation executed by the CPU 301 is described with reference to Table 1. Table 1 is a table for showing an image quality adjustment type.

TABLE 1

| | | Execution condition | | | |
|---|---|---|---|---|---|
| | Image quality | During execution of image | At end of image | Required time | |
| Number | adjustment type | forming operation | forming operation | Typical value | Maximum value |
| 1 | Transfer voltage correction | Value of counter 310 ≥ 250 | Value of counter 310 ≥ 100 | 5 seconds | 20 seconds |
| 2 | Density correction | Value of counter 311 ≥ 300 | Value of counter 311 ≥ 100 | 10 seconds | 10 seconds |
| 3 | Color misregistration correction | Value of counter 312 ≥ 350 | Value of counter 312 ≥ 100 | 20 seconds | 20 seconds |

In Table 1, a type, an execution condition, and a required time of an image quality adjustment executed by the CPU 301 are shown. The required time shown in Table 1 includes two types of a typical value (first prediction time) and a maximum value (second prediction time). The typical value is a time required for an image quality adjustment operation when the image quality adjustment operation is ended as scheduled without causing a retry operation or other such situation that extends the image quality adjustment operation. The maximum value represents the longest time required for an image quality adjustment operation when the image quality adjustment operation is extended due to a retry operation or the like. The maximum value is a value equal to or larger than the typical value.

The retry operation (readjustment operation) is an operation for retrying (readjusting) an image quality adjustment when the image quality adjustment operation fails. When the retry operation is executed, the required time increases so as to correspond to the number of times that the retry operation has been executed. In the embodiment, the transfer voltage correction is an image quality adjustment (first image quality adjustment) having a possibility that the retry operation may be executed. The density correction and the color misregistration correction are each an image quality adjustment (second image quality adjustment) having no possibility that the retry operation may be executed.

The CPU 301 functions as an image quality adjusting portion (adjustment unit) for adjusting image quality of the image to be formed on the sheet by the image forming portion 320. The CPU 301 verifies the execution condition for each image quality adjustment during execution of the image forming operation (printing operation) and at the end of the image forming operation (printing operation). The end of the image forming operation may not only be a time immediately after the image forming operation has been ended but also be an arbitrary time other than a period for executing the image forming operation.

(Execution Determining Operation of Image Quality Adjustment)

Next, with reference to FIG. 4A and FIG. 4B, a description will be made with an operation for determining whether or not the execution condition of the image quality adjustment is satisfied. FIG. 4A and FIG. 4B are flowcharts each illustrating an execution determining operation for the image quality adjustment to be executed by the CPU 301. FIG. 4A is the flowchart for illustrating the execution determining operation for the image quality adjustment to be executed by the CPU 301 during the execution of the image forming operation. When the execution determining operation for the image quality adjustment during the execution of the image forming operation is started, the CPU 301 determines whether or not the value of the counter 310 is 250 or more (S41). In the embodiment, a predetermined threshold value being a reference of the determination is set to 250, but may be another value. When the value of the counter 310 is 250 or more (YES in S41), the CPU 301 adds the transfer voltage correction to the image quality adjustment to be executed (S42). When the value of the counter 310 is not 250 or more (NO in S41), the process advances to Step S43 without adding the transfer voltage correction to the image quality adjustment to be executed.

The CPU 301 determines whether or not the value of the counter 311 is 300 or more (S43). In the embodiment, the predetermined threshold value being the reference of the determination is set to 300, but may be another value. When the value of the counter 311 is 300 or more (YES in S43), the CPU 301 adds the density correction to the image quality adjustment to be executed (S44). When the value of the counter 311 is not 300 or more (NO in S43), the process advances to Step S45 without adding the density correction to the image quality adjustment to be executed.

The CPU 301 determines whether or not the value of the counter 312 is 350 or more (S45). In the embodiment, the predetermined threshold value being the reference of the determination is set to 350, but may be another value. When the value of the counter 312 is 350 or more (YES in S45), the CPU 301 adds the color misregistration correction to the image quality adjustment to be executed (S46). The CPU 301 ends the execution determining operation for the image quality adjustment during the execution of the image forming operation. When the value of the counter 312 is not 350 or more (NO in S45), the CPU 301 ends the execution determining operation for the image quality adjustment during the execution of the image forming operation without adding the color misregistration correction to the image quality adjustment to be executed.

FIG. 4B is the flowchart for illustrating the execution determining operation for the image quality adjustment to be executed by the CPU 301 when the image forming operation is ended. When the execution determining operation for the image quality adjustment at the end of the image forming operation is started, the CPU 301 determines whether or not the value of the counter 310 is 100 or more (S51). When the value of the counter 310 is 100 or more (YES in S51), the CPU 301 adds the transfer voltage correction to the image quality adjustment to be executed (S52). When the value of the counter 310 is not 100 or more (NO in S51), the process advances to Step S53 without adding the transfer voltage correction to the image quality adjustment to be executed.

The CPU 301 determines whether or not the value of the counter 311 is 100 or more (S53). When the value of the counter 311 is 100 or more (YES in S53), the CPU 301 adds the density correction to the image quality adjustment to be executed (S54). When the value of the counter 311 is not 100 or more (NO in S53), the process advances to Step S55 without adding the density correction to the image quality adjustment to be executed.

The CPU 301 determines whether or not the value of the counter 312 is 100 or more (S55). When the value of the counter 312 is 100 or more (YES in S55), the CPU 301 adds the color misregistration correction to the image quality adjustment to be executed (S56). The CPU 301 ends the execution determining operation for the image quality adjustment at the end of the image forming operation. When the value of the counter 312 is not 100 or more (NO in S55), the CPU 301 ends the execution determining operation for the image quality adjustment at the end of the image forming operation without adding the color misregistration correction to the image quality adjustment to be executed. In the embodiment illustrated in FIG. 4B, the predetermined threshold value being the reference of the determination is set to 100, but may be another value.

When any one of the execution conditions within Table 1 is satisfied, the CPU 301 executes the image quality adjustment operation for which the execution condition is satisfied (S41 to S46 of FIG. 4A and S51 to S56 of FIG. 4B). When there are a plurality of image quality adjustments for which the execution condition is satisfied, the CPU 301 combines the image quality adjustment operations, and executes the image quality adjustment operations in ascending order of the number. In the embodiment, when a plurality of image quality adjustment operations are sequentially executed, the image quality adjustment operation having the possibility that the retry operation may be executed is executed before the image quality adjustment operation having no possibility that the retry operation may be executed. Further, in the embodiment, the image quality adjustment operation having a small typical value is executed before the image quality adjustment operation having a large typical value. However, the order of the image quality adjustment operations for a case where a plurality of image quality adjustment operations are sequentially executed is not limited thereto, and may be another order. The CPU 301 is capable of executing the image quality adjustments both individually and in combination based on an instruction received from the UI 330. In any one of the cases, after completing each image quality adjustment, the CPU 301 initializes the value of the counter 310, the value of the counter 311, and the value of the counter 312 to zero.

The transfer voltage correction is an operation for calculating the transfer voltage for obtaining satisfactory transferability based on voltage-current characteristics of the primary transfer device 5. The transfer voltage correction may involve a retry operation when an appropriate transfer voltage fails to be obtained in one operation. Therefore, the typical value of the required time of the transfer voltage correction differs from the maximum value. In the embodiment, the maximum value of the required time of the transfer voltage correction is larger than the typical value. An operation for the transfer voltage correction is described later.

The density correction is an operation for adjusting a toner density inside the developing device 4 of the process unit 120 and a parameter of the image processing portion 316 in order to maintain an appropriate toner density. The toner density represents a toner-carrier mixture ratio (weight ratio) inside the developing device 4 or a quantity of a toner born on the toner image (transferred mass of toner per area of the toner image) formed on the intermediate transfer belt 130. In a density correction operation, a patch image for the density correction is formed on the intermediate transfer belt 130. The patch sensor 406 detects a density of the patch image for the density correction. The CPU 301 compares the detected density of the patch image for the density correction with a target density, and adjusts the toner amount to be supplied to the developing device 4 or adjusts the parameter of the image processing portion 316 based on a result of the comparison. The density correction does not involve the execution of a retry operation, and the operation is completed in 10 seconds being the typical value of the required time. In the embodiment, the maximum value of the required time of the density correction is the same as the typical value.

The color misregistration correction is an operation for adjusting a parameter of the image processing portion 316 in order to reduce a color misregistration amount of the color image to be formed on the sheet. In a color misregistration correction operation, the pattern image for the color misregistration correction is formed on the intermediate transfer belt 130. The patch sensor 406 detects the pattern image for the color misregistration correction. The CPU 301 compares a timing at which the pattern image for the color misregistration correction was actually detected with a target timing for the pattern image that is ideal, and adjusts a timing for emitting the light beam from the light scanning device 3 based on the misregistration amount (difference). The color misregistration correction does not involve the execution of a retry operation, and the operation is completed in 20 seconds being the typical value of the required time. In the embodiment, the maximum value of the required time of the color misregistration correction is the same as the typical value.

The above-mentioned image quality adjustment types are examples of the image quality adjustments executed by the image forming apparatus 100, and the present invention is not limited thereto. The required time of each of the transfer voltage correction, the density correction, and the color misregistration correction is not limited to the above-mentioned numerical value, and may be set to a value corresponding to the structure of the image forming apparatus 100.

(Transfer Voltage Correction)

Figure 5:
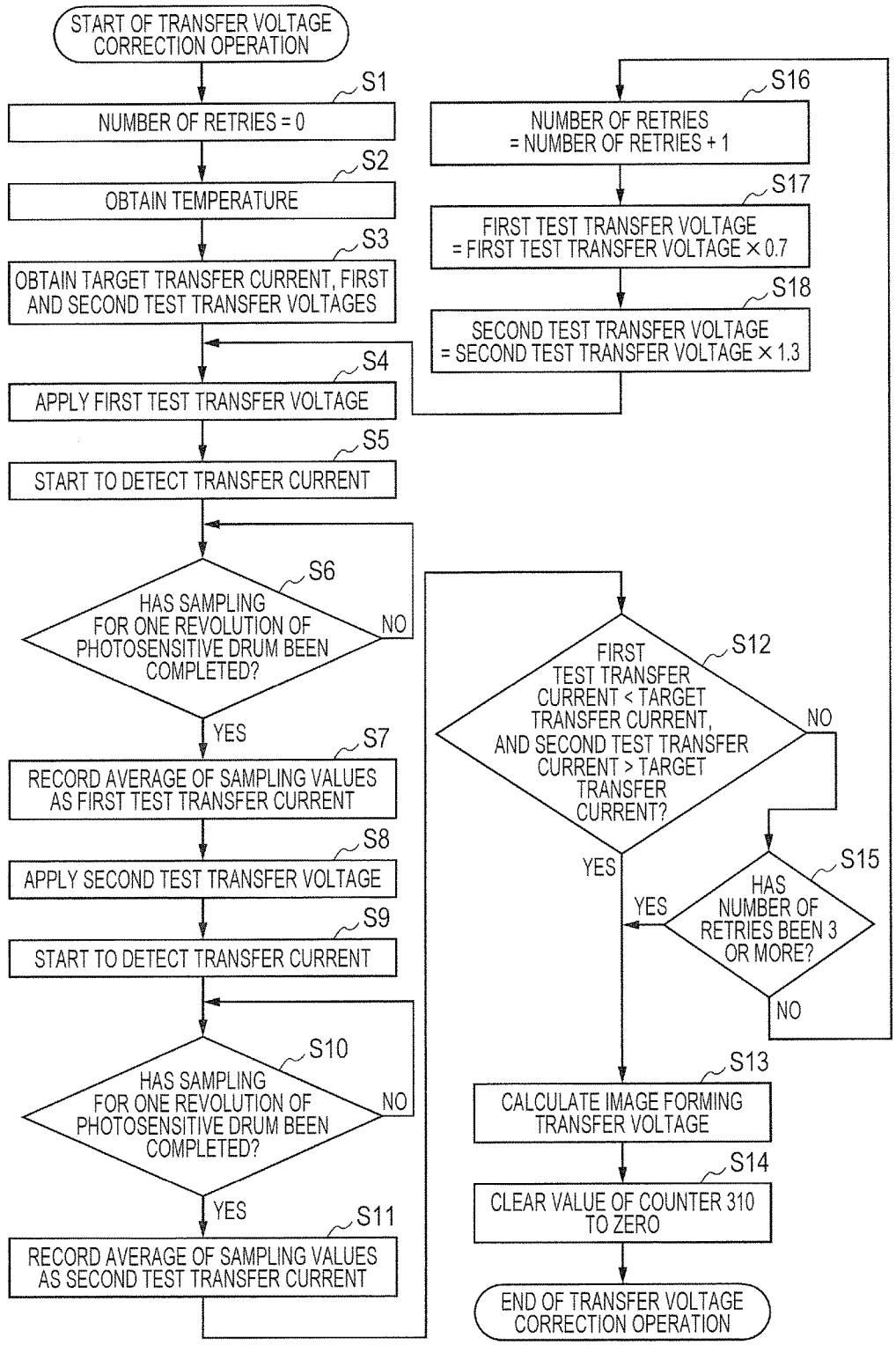
FIG. 5 is a flowchart for illustrating a transfer voltage correction operation executed by a CPU according to a first embodiment of the present invention.

Next, with reference to FIG. 5, a description is made of the transfer voltage correction being one of the image quality adjustment operations executed by the CPU 301 according to the first embodiment. FIG. 5 is a flowchart for illustrating a transfer voltage correction operation executed by the CPU 301 according to the first embodiment. The CPU 301 executes the transfer voltage correction operation based on a program stored in the ROM 302.

The CPU 301 compares the value of the counter 310 with a predetermined threshold value for each primary transfer operation. When the value of the counter 310 is equal to or larger than the predetermined threshold value, the CPU 301 executes the transfer voltage correction operation illustrated in FIG. 5. During the execution of the image forming operation, the CPU 301 temporarily suspends the image forming operation to start the transfer voltage correction operation. After the transfer voltage correction operation is ended, the CPU 301 restarts the image forming operation. At the end of the image forming operation, the CPU 301 starts the transfer voltage correction operation after determining that the value of the counter 310 is equal to or larger than the predetermined threshold value.

When the transfer voltage correction operation is started, the CPU 301 clears the number of retries to zero (S1). The CPU 301 obtains a present temperature based on a detection signal of the environmental sensor 405 (S2). The CPU 301 obtains a target transfer current for obtaining the satisfactory transferability from the ROM 302 based on the obtained temperature (S3). The CPU 301 further obtains a first test transfer voltage and a second test transfer voltage for obtaining the voltage-current characteristics from the ROM 302 (S3). The first test transfer voltage is lower than the second test transfer voltage in terms of absolute value (|(first test transfer voltage)|<|(second test transfer voltage)|).

Subsequently, the CPU 301 applies the first test transfer voltage to the primary transfer device 5 (S4). The CPU 301 starts causing the transfer voltage sensors 11Y, 11M, 11C, and 11K of the primary transfer devices 5Y, 5M, 5C, and 5K to detect a transfer current (S5). The CPU 301 samples a value of the transfer current for one revolution of the photosensitive drum 1 at intervals defined in advance based on detection signals of the transfer voltage sensors 11Y, 11M, 11C, and 11K (S6). The CPU 301 averages the sampled values, and records a value obtained by the averaging in the RAM 303 as a first test transfer current (S7).

Subsequently, the CPU 301 applies the second test transfer voltage to the primary transfer device 5 (S8). In the same manner as in the case of the first test transfer voltage, the CPU 301 starts causing the transfer voltage sensor 11 to detect the transfer current (S9), and samples the value of the transfer current for one revolution of the photosensitive drum 1 (S10). The CPU 301 averages the sampled values, and records a value obtained by the averaging in the RAM 303 as a second test transfer current (S11).

Subsequently, the CPU 301 examines whether or not the target transfer current falls within a range between the detected first test transfer current and the detected second test transfer current. Specifically, the CPU 301 determines whether or not the first test transfer current is smaller than the target transfer current and the second test transfer current is larger than the target transfer current (S12). When the target transfer current falls within the range between the first test transfer current and the second test transfer current (YES in S12), the CPU 301 conducts linear interpolation from the voltage-current characteristics at two points, and calculates an image forming transfer voltage from which the target transfer current can be obtained (S13). The CPU 301 clears the value of the counter 310 to zero (S14), and ends the transfer voltage correction operation.

Meanwhile, when the target transfer current does not fall within the range between the first test transfer current and the second test transfer current, appropriate voltage-current characteristics fail to be obtained from the calculation of the image forming transfer voltage, and hence the CPU 301 determines that the first test transfer voltage and the second test transfer voltage are not appropriate. Therefore, the CPU 301 changes the first test transfer voltage and the second test transfer voltage to conduct the retry operation. When the target transfer current does not fall within the range between the first test transfer current and the second test transfer current (NO in S12), the CPU 301 determines whether or not the number of retries is three (predetermined number of times) or more (S15). When the number of retries is not three or more (NO in S15), the CPU 301 increments the number of retries by one (S16).

The CPU 301 resets the first test transfer voltage by multiplying the first test transfer voltage by a first coefficient as in the following expression (S17). In the embodiment, the first coefficient is 0.7.

(first test transfer voltage)=(first test transfer voltage)×0.7

Further, the CPU 301 resets the second test transfer voltage by multiplying the second test transfer voltage by a second coefficient as in the following expression (S18). In the embodiment, the second coefficient is 1.3.

(second test transfer voltage)=(second test transfer voltage)×1.3

After that, the process returns to Step S4, and the CPU 301 again conducts the application of the first test transfer voltage and the second test transfer voltage and the detection of the first test transfer current and the second test transfer current, and determines whether or not the target transfer current falls within the range between the obtained two test transfer currents (S4 to S12).

When the target transfer current does not fall within the range between the two test transfer currents even after the retry operation is conducted three times (YES in S15), the CPU 301 conducts extrapolation from the last result to calculate the image forming transfer voltage (S13). As described above, the required time of the transfer voltage correction is changed based on the number of times that the retry operation has been executed. The above-mentioned transfer voltage correction operation is merely an example, and the present invention is not limited to the above-mentioned transfer voltage correction operation.

(Prediction of Image Quality Adjustment Time)

Figure 6:
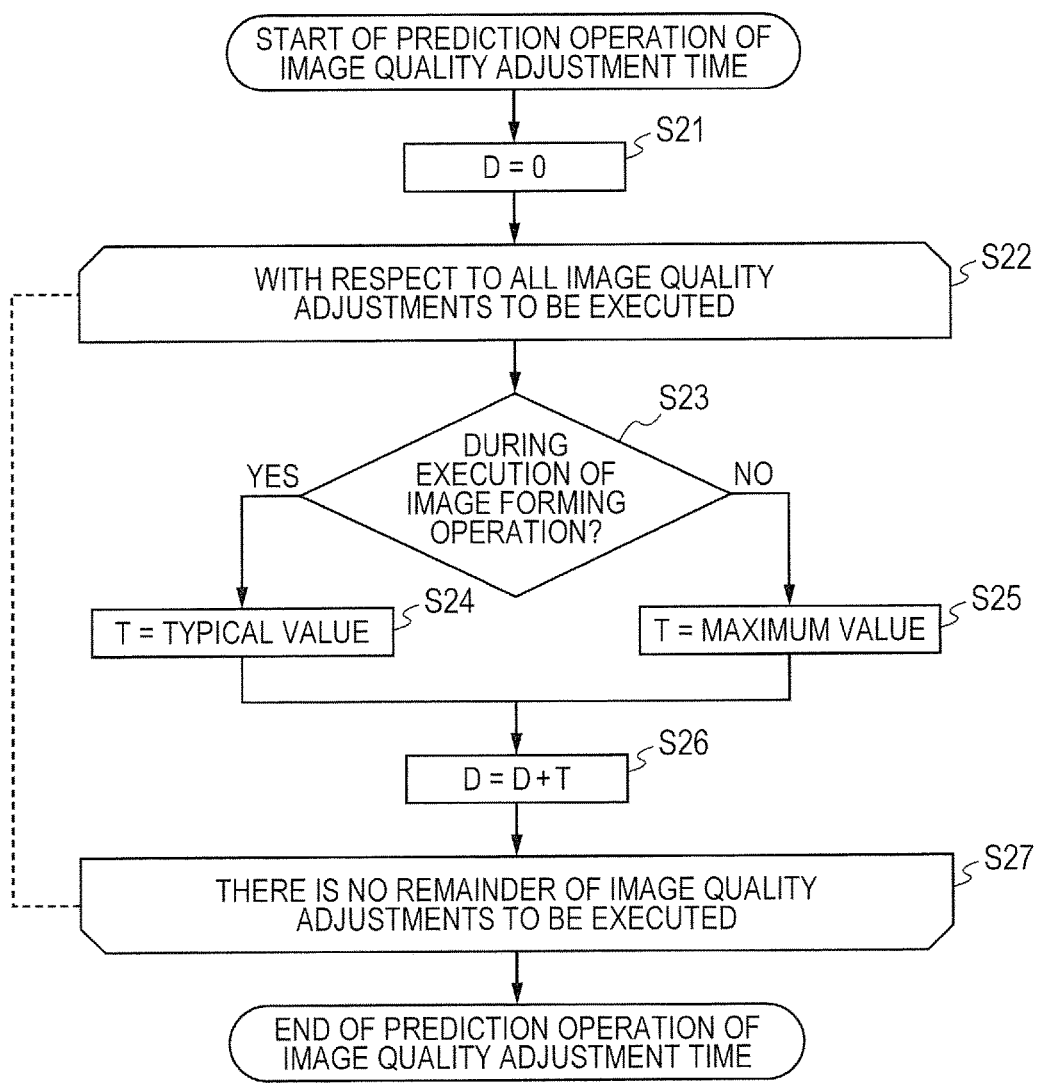
FIG. 6 is a flowchart for illustrating a prediction operation of an image quality adjustment time executed by the CPU according to the first embodiment.

Next, with reference to Table 1 and FIG. 6, a description will be made with a prediction method for an image quality adjustment time according to the first embodiment. FIG. 6 is a flowchart for illustrating a prediction operation of the image quality adjustment time to be executed by the CPU 301 according to the first embodiment. The CPU 301 executes the prediction operation of the image quality adjustment time based on a program stored in the ROM 302. The CPU 301 functions as an image quality adjustment time prediction portion configured to predict the image quality adjustment time required for executing at least one image quality adjustment that satisfies the execution condition (determination unit configured to determine an adjustment time). Before executing the image quality adjustment, the CPU 301 executes the prediction operation of the image quality adjustment time illustrated in FIG. 6 in order to calculate the image quality adjustment time of the image quality adjustment to be executed individually or a total image quality adjustment time of a plurality of image quality adjustments to be executed in combination.

When the prediction operation of the image quality adjustment time is started, the CPU 301 initializes an image quality adjustment time D to zero (S21). The CPU 301 predicts the image quality adjustment time by repeating the loop from Step S22 to Step S27 for all the image quality adjustments that satisfy the execution condition within Table 1. The CPU 301 determines whether or not the image forming operation (printing operation) is being executed (S23). When the image forming operation is being executed (YES in S23), the CPU 301 obtains the typical value (first prediction time) of the image quality adjustment satisfying the execution condition from Table 1 as a required time T (S24). The CPU 301 adds the required time T to the image quality adjustment time D (S26). Meanwhile, when the image forming operation is not being executed (NO in S23), the CPU 301 obtains the maximum value (second prediction time) of the image quality adjustment satisfying the execution condition from Table 1 as the required time T (S25). The second prediction time is equal to or larger than the first prediction time. The CPU 301 adds the required time T to the image quality adjustment time D (S26). When the image quality adjustment is executed individually, the CPU 301 ends the prediction operation of the image quality adjustment time. When a plurality of image quality adjustments are executed sequentially, the CPU 301 repeats the loop from Step S22 to Step S27 for the next image quality adjustment, and adds the required time T of the next image quality adjustment to the image quality adjustment time D. After obtaining the image quality adjustment time D from the required times T of all the image quality adjustments to be executed sequentially, the CPU 301 ends the prediction operation of the image quality adjustment time.

An example of the image quality adjustment time D will be described below.

For example, when the transfer voltage correction is executed individually during the execution of the image forming operation, the required time T is 5 seconds being the typical value, and hence the image quality adjustment time D is 5 seconds. Meanwhile, when the transfer voltage correction is executed individually at the end of the image forming operation, the required time T is 20 seconds being the maximum value, and hence the image quality adjustment time D is 20 seconds. For example, when the transfer voltage correction and the density correction are executed sequentially during the execution of the image forming operation, the required time T of the transfer voltage correction is 5 seconds being the typical value, and the required time T of the density correction is 10 seconds being the typical value as well. Therefore, when the image quality adjustment time D for a case where the transfer voltage correction and the density correction are executed sequentially during the execution of the image forming operation is 15 seconds (=(5 seconds)+(10 seconds)). Meanwhile, when the transfer voltage correction and the density correction are executed sequentially at the end of the image forming operation, the required time T of the transfer voltage correction is 20 seconds being the maximum value, and the required time T of the density correction is 10 seconds being the typical value. Therefore, the image quality adjustment time D for a case where the transfer voltage correction and the density correction are executed sequentially at the end of the image forming operation is 30 seconds (=(20 seconds)+(10 seconds)).

(Displaying of Image Quality Adjustment Time)

Figure 7:
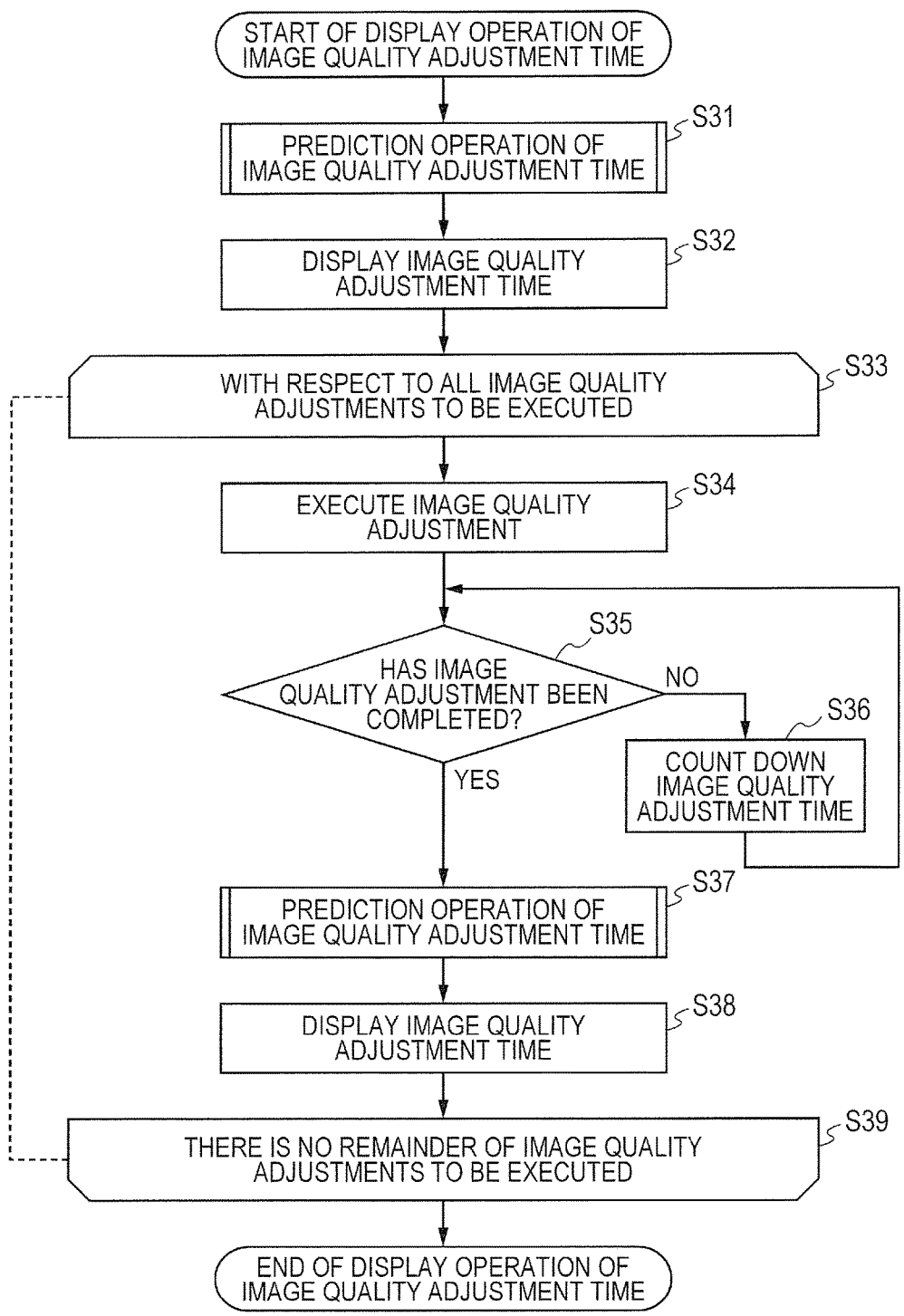
FIG. 7 is a flowchart for illustrating a display operation of the image quality adjustment time executed by the CPU.
Figure 8:
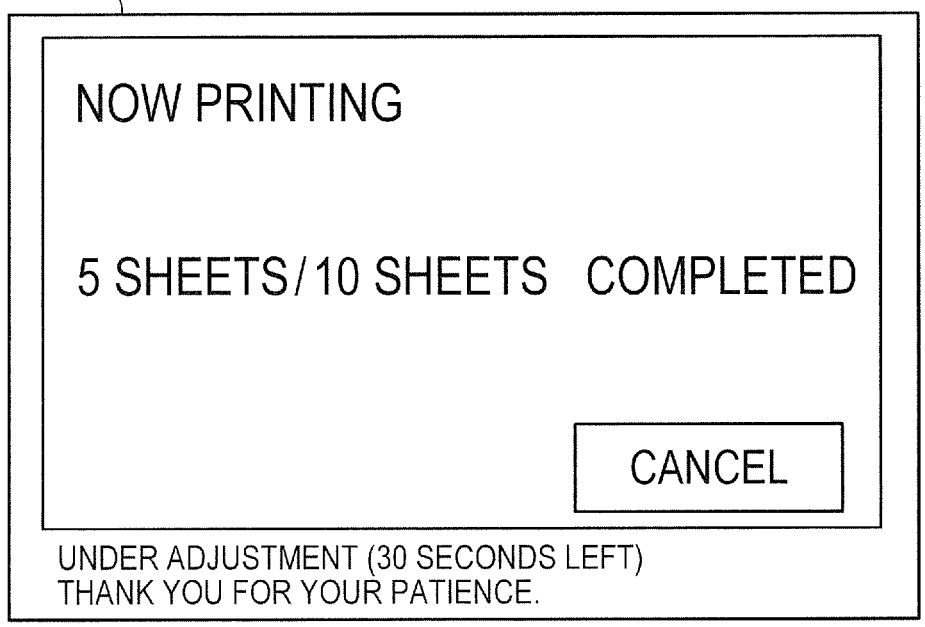
FIG. 8 is a diagram for illustrating a display example of the image quality adjustment time.

Next, with reference to Table 1, FIG. 7, and FIG. 8, a description is made of a display operation of the image quality adjustment time D. FIG. 7 is a flowchart for illustrating the display operation of the image quality adjustment time D executed by the CPU 301. The CPU 301 executes the display operation of the image quality adjustment time D based on a program stored in the ROM 302. When any one of the execution conditions for the image quality adjustment shown in Table 1 is satisfied, the CPU 301 starts the display operation of the image quality adjustment time D.

When a display operation of the image quality adjustment time is started, the CPU 301 predicts the image quality adjustment time D for all the image quality adjustments to be executed based on a subroutine of the above-mentioned prediction operation of the image quality adjustment time (FIG. 6) (S31). The CPU 301 displays the predicted image quality adjustment time D on the display 334 of the UI 330 (S32).

FIG. 8 is a diagram for illustrating a display example of the image quality adjustment time. According to the embodiment, the image quality adjustment time D is displayed in a lower part of the display 334 as illustrated in FIG. 8. The image quality adjustment time D is displayed by being parenthesized after the wording "under adjustment" as remaining seconds while being counted down.

The CPU 301 repeats the loop from Step S33 to Step S39 for all the image quality adjustments to be executed, and displays the image quality adjustment time. When a plurality of image quality adjustments are executed sequentially, the CPU 301 executes the plurality of image quality adjustments in order (S33, S34, and S39). The CPU 301 determines whether or not one type of image quality adjustment has been completed (S35). When one type of image quality adjustment has not been completed (NO in S35), the CPU 301 subtracts a unit time from the image quality adjustment time D for each unit time, and counts down the image quality adjustment time D (S36). In the embodiment, the unit time for displaying the countdown is 1 second, but may be another time, e.g., 2 seconds or 3 seconds. While the image quality adjustment is being executed, a remaining time displayed on the display 334 is updated every second by the countdown (S35 and S36).

When one type of image quality adjustment is completed (YES in S35), the CPU 301 again executes the prediction operation of the image quality adjustment time for a remainder of the image quality adjustment (S37). The CPU 301 displays the image quality adjustment time D predicted again on the display 334 of the UI 330 (S38). When an actual time taken for the image quality adjustment is different from the required time T predicted before the execution, the remaining time displayed on the display 334 increases or decreases by 1 second or more. For example, when the transfer voltage correction and the density correction are executed sequentially at the end of the image forming operation, the image quality adjustment time D predicted first is 30 seconds. When the transfer voltage correction executed first is successful without any retry operation being executed, the remaining time immediately before the execution of the density correction is 25 seconds. However, the remaining required time of the density correction is 10 seconds, and hence the image quality adjustment time D is again predicted in Step S37, to thereby decrease the displayed remaining time from 25 seconds to 10 seconds at once.

In this manner, in the embodiment, each time one image quality adjustment among at least one image quality adjustment to be executed is completed, the CPU 301 again predicts the image quality adjustment time, and updates the image quality adjustment time displayed on the display 334 based on the image quality adjustment time predicted again. The CPU 301 repeats the processing of Step S33 to Step S39 for all the image quality adjustments to be executed, and when there is no remainder of the image quality adjustment to be executed (S39), ends the display operation of the image quality adjustment time.

As described above, according to the embodiment, the typical value relating to the image quality adjustment involving no retry operation is used for a case where the image quality adjustment time D is displayed during the execution of the image forming operation, but the value equal to or larger than the typical value is used for a case where the image quality adjustment time D is displayed while the image forming operation is not being executed. That is, when the image quality adjustment time of a given image quality adjustment is displayed, a displayed time for a case where the given image quality adjustment is not to be followed by a print job is set equal to or larger than a displayed time for a case where the given image quality adjustment is to be followed by a print job. In the case where the given image quality adjustment is not to be followed by a print job, the displayed image quality adjustment time is a time to be taken until the image forming apparatus 100 becomes available to the user next as it is. With this configuration, in the case where the image quality adjustment time D is displayed while the image forming operation is not being executed, even when the time taken for the image quality adjustment operation becomes longer than a typical operation time due to the retry operation or the like, the image quality adjustment time D with an extended time taken into consideration is displayed. Therefore, it is possible to guarantee at least a time at which the image forming apparatus 100 becomes available next. For example, it is possible to prevent a situation in which the image quality adjustment has not been completed yet when the user who has confirmed the displayed image quality adjustment time returns to the image forming apparatus 100 after the displayed image quality adjustment time has elapsed since the user was away from the image forming apparatus 100. This contributes to an improvement in usability.

According to the embodiment, it is possible to display the image quality adjustment time that allows the user to easily grasp a time at which the user can collect an output product and a time at which the image forming apparatus becomes available next.

Second Embodiment

Next, the second embodiment will be described. In the second embodiment, the same components as those of the first embodiment are denoted by the same reference symbols, and descriptions thereof are omitted. The image forming apparatus 100, the image forming operation, the image quality adjustment operation, the execution determining operation for the image quality adjustment, and the display operation of the image quality adjustment time according to the second embodiment are the same as those of the first embodiment, and hence descriptions thereof are omitted. The second embodiment is different from the first embodiment in the transfer voltage correction operation and the prediction operation of the image quality adjustment time, and hence the different points are mainly described below.

(Transfer Voltage Correction)

Figure 9:
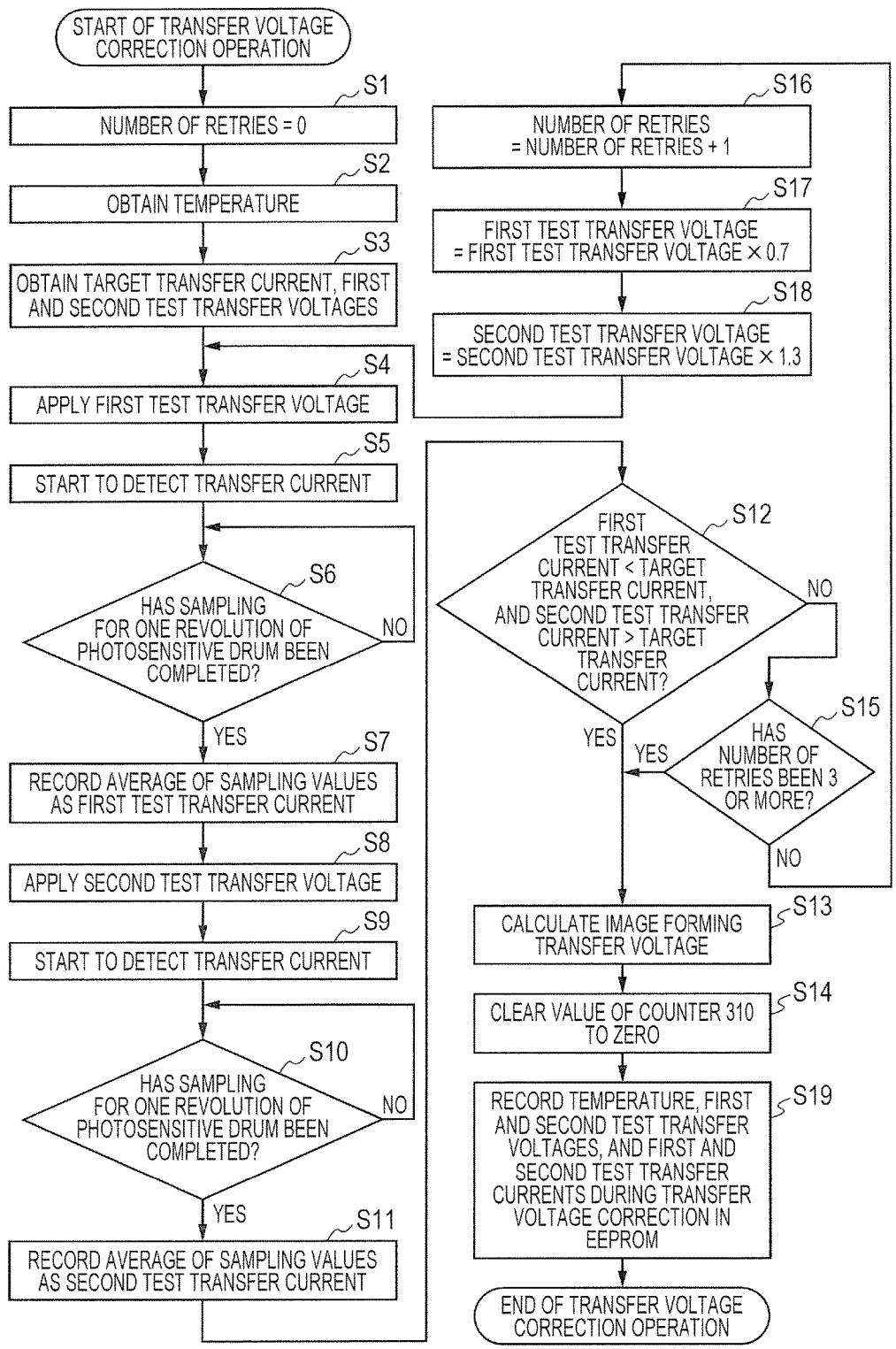
FIG. 9 is a flowchart for illustrating a transfer voltage correction operation executed by a CPU according to a second embodiment of the present invention.

With reference to FIG. 9, a description will be made with the transfer voltage correction being one of the image quality adjustment operations executed by the CPU 301 according to the second embodiment. FIG. 9 is a flowchart for illustrating a transfer voltage correction operation executed by the CPU 301 according to the second embodiment. The CPU 301 according to the second embodiment executes the transfer voltage correction operation based on a program stored in the ROM 302.

In the flowchart of FIG. 9, Step S1 to Step S18 are the same as Step S1 to Step S18 of the flowchart of FIG. 5 according to the first embodiment, and hence descriptions thereof are omitted. In the second embodiment, the CPU 301 clears the value of the counter 310 to zero (S14), and then records usage history information on a primary transfer device (image forming member) 5 in the EEPROM 304 (S19). The usage history information includes the temperature, the first test transfer voltage, the second test transfer voltage, the first test transfer current, and the second test transfer current during the transfer voltage correction. The CPU 301 records the temperature, the first test transfer voltage, the second test transfer voltage, the first test transfer current, and the second test transfer current during the transfer voltage correction in the EEPROM 304 irrespective of whether or not the retry operation has been executed (S19), and ends the transfer voltage correction operation. The usage history information on the primary transfer device 5 recorded in the EEPROM 304 is used in the prediction operation of the image quality adjustment time.

(Prediction of Image Quality Adjustment Time)

Figure 10:
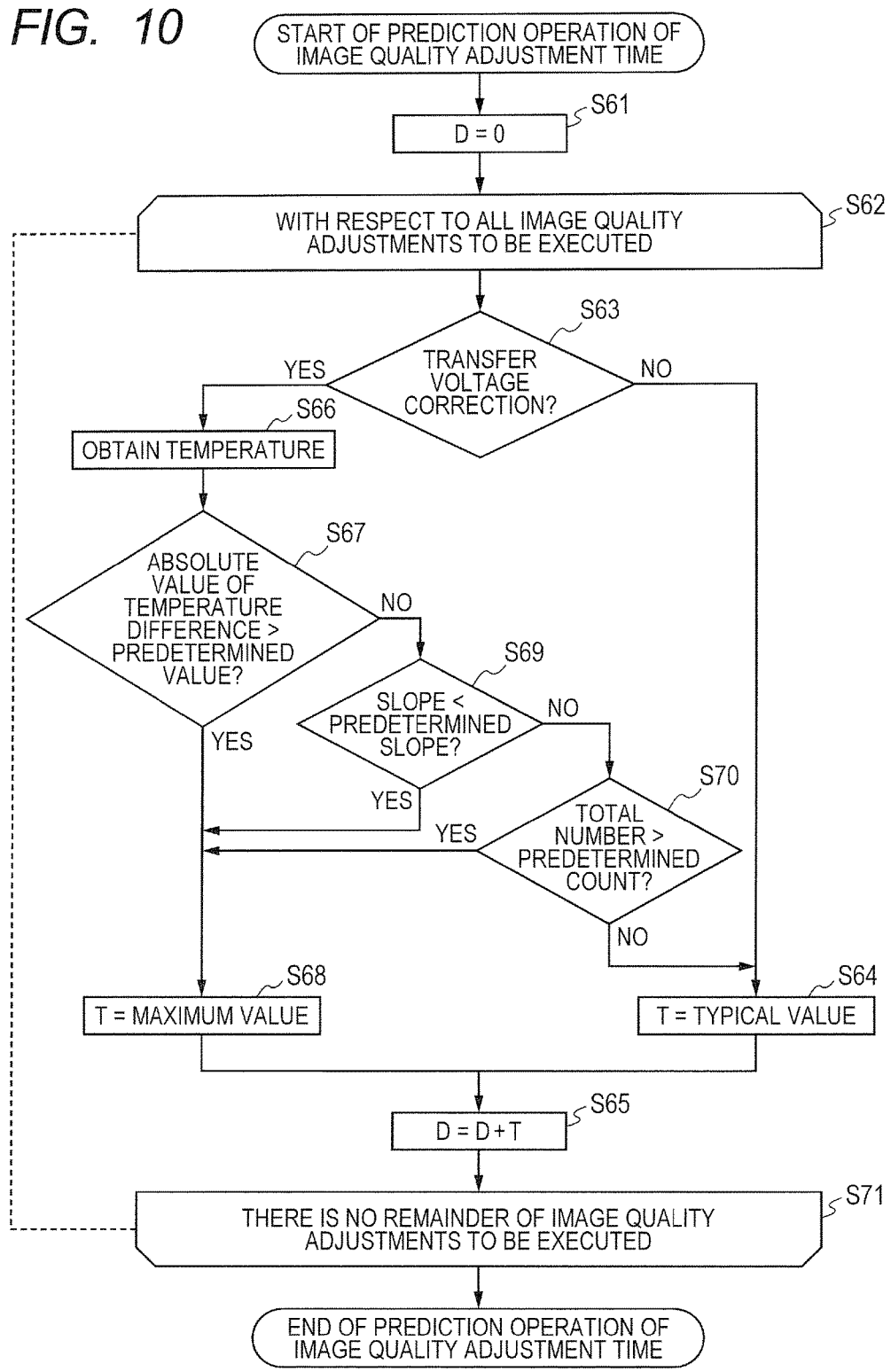
FIG. 10 is a flowchart for illustrating a prediction operation of an image quality adjustment time executed by the CPU according to the second embodiment.

Next, with reference to Table 1 and FIG. 10, a description is made of a prediction method for an image quality adjustment time according to the second embodiment. FIG. 10 is a flowchart for illustrating a prediction operation of the image quality adjustment time to be executed by the CPU 301 according to the second embodiment. The CPU 301 executes the prediction operation of the image quality adjustment time based on a program stored in the ROM 302. Before executing the image quality adjustment, the CPU 301 executes the prediction operation of the image quality adjustment time illustrated in FIG. 10 in order to calculate the image quality adjustment time of the image quality adjustment to be executed individually or a total image quality adjustment time of all adjustments of a plurality of image quality adjustments to be executed in combination.

When the prediction operation of the image quality adjustment time is started, the CPU 301 initializes the image quality adjustment time D to zero (S61). The CPU 301 predicts the image quality adjustment time by repeating the loop from Step S62 to Step S71 for all the image quality adjustments that satisfy the execution condition within Table 1. The CPU 301 determines the required time T for each type of all the image quality adjustments to be executed (S63 and S68). The CPU 301 determines whether or not the image quality adjustment to be executed is the transfer voltage correction (S63). When the image quality adjustment to be executed is not the transfer voltage correction (NO in S63), the CPU 301 obtains the typical value (first prediction time) of the image quality adjustment to be executed from Table 1 as the required time T (S64). The CPU 301 adds the required time T to the image quality adjustment time D (S65).

Meanwhile, when the image quality adjustment to be executed is the transfer voltage correction (YES in S63), the CPU 301 predicts presence or absence of the retry operation from history information relating to the transfer voltage correction, and determines the required time T based on a result of the prediction. The first piece of history information to be examined is environmental information obtained when the transfer voltage correction was executed previously (temperature and humidity environment obtained in the past execution and temperature and humidity characteristics in the past execution). The CPU 301 first obtains the present temperature from the environmental sensor 405 as present environmental information (temperature and humidity information) (S66). The CPU 301 determines whether or not the absolute value of a temperature difference between the present temperature and the temperature during the previous transfer voltage correction recorded in the EEPROM 304 is larger than a predetermined value (S67). When the absolute value of the temperature difference is larger than the predetermined value (YES in S67), it is expected that temperature characteristics of the primary transfer device 5 have been greatly changed. In that case, the test transfer voltage to be applied at the time of the transfer voltage correction cannot be selected appropriately, and a retry operation is liable to occur. In view of the foregoing, when the absolute value of the temperature difference is larger than the predetermined value (YES in S67), the CPU 301 obtains the maximum value (second prediction time) of the image quality adjustment to be executed from Table 1 as the required time T (S68). The CPU 301 adds the required time T to the image quality adjustment time D (S65). Meanwhile, when the absolute value of the temperature difference is not larger than the predetermined value (NO in S67), the processing advances to Step S69.

The second piece of history information to be examined is I-V characteristics (voltage-current characteristics) of the primary transfer device 5 exhibited at the time of the previous transfer voltage correction. The CPU 301 determines whether or not a slope of the I-V characteristics (voltage-current characteristics) exhibited at the time of the previous transfer voltage correction is smaller than a predetermined slope (S69). The CPU 301 calculates a slope of a detection current I relative to an applied voltage V through use of the first test transfer voltage, the second test transfer voltage, the first test transfer current, and the second test transfer current obtained in the previous transfer voltage correction, which are recorded in the EEPROM 304.

Figure 11A:
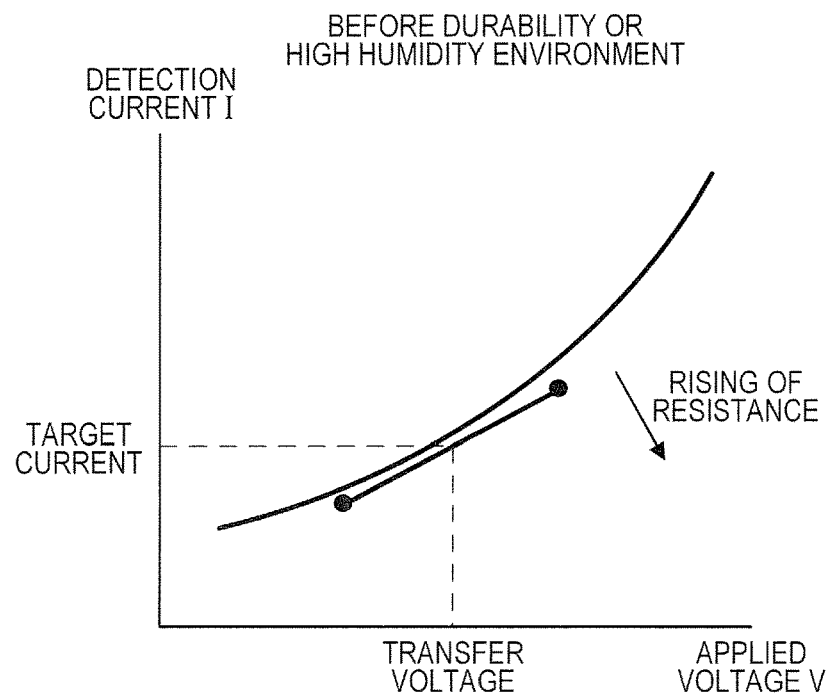
FIGS. 11A and 11B are graphs for showing I-V characteristics of a primary transfer device.
Figure 11B:
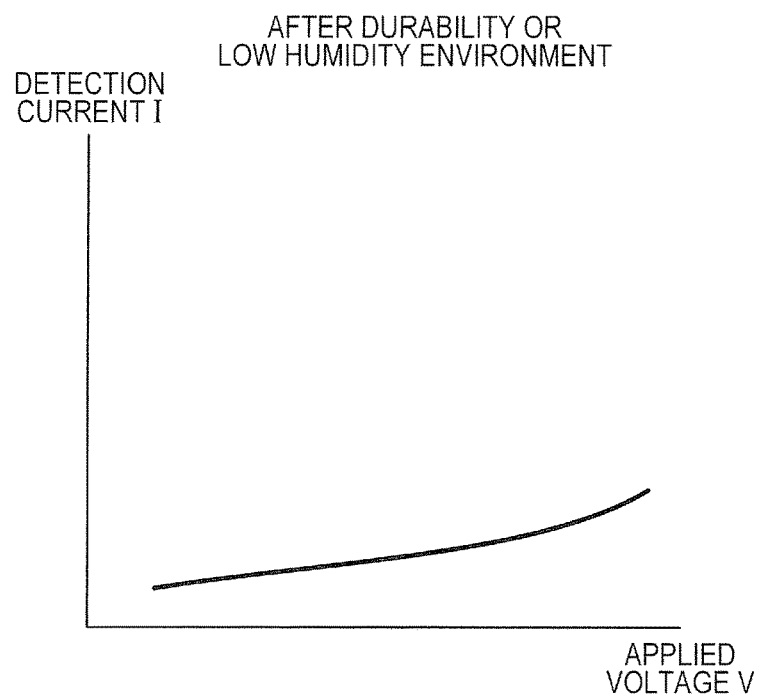

FIG. 11A and FIG. 11B are graphs for showing the I-V characteristics of the primary transfer device 5. FIG. 11A is the graph for showing the I-V characteristics exhibited before durability or high humidity environment. FIG. 11B is the graph for showing the I-V characteristics exhibited after durability or low humidity environment. The I-V characteristics has such a relationship as shown in FIG. 11A and FIG. 11B, and exhibits a slope closer to a flat shape as a resistance increases in a part through which the transfer current is caused to flow. The increase in resistance of the primary transfer device 5 is caused by the elapsed time of durability of a member, the environment exhibiting a lower humidity, or the like. When the slope is smaller than a predetermined slope, it is expected that an electric resistance of the primary transfer device 5 has become larger. In that case, a change in test transfer current is smaller than a change in test transfer voltage, and a retry is liable to occur. Therefore, when the slope of the I-V characteristics is smaller than the predetermined slope (YES in S69), the maximum value of the image quality adjustment to be executed is obtained from Table 1 as the required time T (S68). The CPU 301 adds the required time T to the image quality adjustment time D (S65). Meanwhile, when the slope of the I-V characteristics is not smaller than the predetermined slope (NO in S69), the slope of the I-V characteristics is determined to be normal, and hence the processing advances to Step S70.

The third piece of history information to be examined is durability information to be used as the usage history information on the primary transfer device 5. In the embodiment, the durability information is the total number of primary transfer operations (total number of uses of the primary transfer device 5) executed by the primary transfer device 5. The CPU 301 determines whether or not the value of the counter 313 (total number of primary transfer operation) incremented each time the primary transfer operation is conducted is larger than the predetermined value (predetermined count) (S70). When the total number of the counter 313 is larger than the predetermined count, it is expected that the primary transfer device 5 deteriorates by undergoing voltage application for a long period of time and has a large electric resistance. When the electric resistance of the primary transfer device 5 becomes larger, the change in test transfer current becomes smaller than the change in test transfer voltage, and a retry is liable to occur. In view of the foregoing, when the total number of the counter 313 is larger than the predetermined count (YES in S70), the CPU 301 obtains the maximum value of the image quality adjustment to be executed from Table 1 as the required time T (S68). The CPU 301 adds the required time T to the image quality adjustment time D (S65). Meanwhile, when the total number of the counter 313 is not larger than the predetermined count (NO in S70), the CPU 301 obtains the typical value of the image quality adjustment to be executed from Table 1 as the required time T (S64). The CPU 301 adds the required time T to the image quality adjustment time D (S65).

When the image quality adjustment is executed individually, the CPU 301 ends the prediction operation of the image quality adjustment time. When a plurality of image quality adjustments are executed sequentially, the CPU 301 repeats the loop from Step S62 to Step S71 for the next image quality adjustment, and adds the required time T of the next image quality adjustment to the image quality adjustment time D. After obtaining the image quality adjustment time D from the required times T of all the image quality adjustments to be executed sequentially, the CPU 301 ends the prediction operation of the image quality adjustment time.

As described above, according to the second embodiment, when an adjustment time of the image quality adjustment that can cause a retry is predicted, presence or absence of an occurrence of a retry is predicted through use of the past history information on a member involved in the image quality adjustment. This improves the accuracy of the prediction of the image quality adjustment time, and allows the user to easily grasp the time at which the user can obtain a printed product and the time at which the image forming apparatus becomes available next, which contributes to the increase in usability.

According to the embodiment, it is possible to display the image quality adjustment time that allows the user to easily grasp the time at which the user can collect the output product and the time at which the image forming apparatus becomes available next.

In the above-mentioned embodiments, the image forming apparatus 100 is described by taking the electrophotographic color copying machine as an example, but the present invention is not limited thereto. The present invention may be applied to, for example, an electrophotographic printer (for example, color laser beam printer or color LED printer), a multifunction peripheral (MFP), a facsimile apparatus, and a printing machine. The present invention may further be applied to not only a color image forming apparatus but also an image forming apparatus configured to form a monochrome image. Moreover, the present invention may be applied to an image forming apparatus employing electrostatic recording.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-251691, filed Dec. 24, 2015, which is hereby incorporated by reference herein in its entirety.

What is claimed is:

1. An image forming apparatus, comprising:
a printer configured to form an image on a sheet;
a display configured to display a remaining time in which a print job is not performed by the printer in a case where an image quality adjustment control for adjusting a parameter of the printer is performed, the remaining time being counted down;
a processor configured to execute instructions to:
perform a first image quality adjustment control;
perform a second image quality adjustment control different from the first image quality adjustment control;
control whether or not to perform the first image quality adjustment control repeatedly;
determine the remaining time based on a first time corresponding to the first image quality adjustment control and a second time corresponding to the second image quality adjustment control in a case where the first image quality adjustment control and the second image quality adjustment control are continuously performed after the printer finishes performing a print job, wherein the processor determines again the remaining time based on the second time before the second image quality adjustment control is performed in the case where the first image quality adjustment control and the second image quality adjustment control are continuously performed after the printer finishes performing the print job; and
determine the remaining time based on a third time corresponding to the first image quality adjustment control and the second time corresponding to the second image quality adjustment control in a case where the first image quality adjustment control and the second image quality adjustment control are continuously performed by interrupting a print job, the third time being shorter than the first time, wherein the processor determines again the remaining time based on the second time before the second image quality adjustment control is performed in the case where the first image quality adjustment control and the second image quality adjustment control are continuously performed by interrupting the print job.

2. The image forming apparatus according to claim 1, further comprising a sensor configured to measure a measurement image formed by the printer,
wherein the second image quality adjustment control includes a density correction in which a density of an image to be formed by the printer is adjusted based on a measurement result of the measurement image by the sensor.

3. The image forming apparatus according to claim 1, further comprising a sensor configured to detect pattern images, having different colors, formed by the printer, the pattern images being used for detecting color misregistration,
wherein the second image quality adjustment control includes color misregistration correction in which the color misregistration is adjusted based on a detection result of the sensor.

* * * * *